United States Patent
Hamilton, II et al.

(10) Patent No.: US 9,600,306 B2
(45) Date of Patent: Mar. 21, 2017

(54) CLIENT-SIDE SIMULATED VIRTUAL UNIVERSE ENVIRONMENT

(75) Inventors: Rick A. Hamilton, II, Charlottesville, VA (US); James R. Kozloski, New Fairfield, CT (US); Clifford A. Pickover, Yorktown Heights, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 12/363,757

(22) Filed: Jan. 31, 2009

(65) Prior Publication Data

US 2010/0199193 A1  Aug. 5, 2010

(51) Int. Cl.
G06F 9/455 (2006.01)
A63F 13/40 (2014.01)
A63F 13/30 (2014.01)
G06F 17/30 (2006.01)
H04L 29/06 (2006.01)
A63F 13/34 (2014.01)

(52) U.S. Cl.
CPC .............. *G06F 9/455* (2013.01); *A63F 13/10* (2013.01); *A63F 13/12* (2013.01); *G06F 17/30899* (2013.01); *H04L 67/38* (2013.01); *A63F 13/34* (2014.09); *A63F 2300/8082* (2013.01)

(58) Field of Classification Search
USPC ......................................... 715/753, 757–758
See application file for complete search history.

(56) References Cited

U.S. PATENT DOCUMENTS

| 5,727,135 | A | * | 3/1998 | Webb et al. ................. 358/1.14 |
| 6,447,396 | B1 | * | 9/2002 | Galyean, III ........... A63F 13/12 |
| | | | | 348/552 |
| 7,181,690 | B1 | * | 2/2007 | Leahy ..................... A63F 13/12 |
| | | | | 715/706 |
| 7,278,030 | B1 | | 10/2007 | Chen et al. |
| 7,506,265 | B1 | * | 3/2009 | Traut et al. ................... 715/763 |
| 2003/0195735 | A1 | * | 10/2003 | Rosedale et al. ............... 703/13 |

(Continued)

FOREIGN PATENT DOCUMENTS

| JP | H08235098 A | 9/1996 |
| JP | 2000-112861 A | 4/2000 |

(Continued)

OTHER PUBLICATIONS

Pekkola, S. et al., "Collaborative Virtual Environments in the Year of the Dragon," CVE 2000, San Francisco, CA, copyright 2000 ACM 1-58113-303-0/0/00/09, pp. 11-18.

(Continued)

*Primary Examiner* — Amy M Levy
(74) *Attorney, Agent, or Firm* — William H. Hartwell; Hunter E. Webb; Keohane & D'Alessandro PLLC

(57) ABSTRACT

An invention that provides a client-side simulated virtual universe environment is provided. In one embodiment, there is a simulation tool, including an analysis component configured to identify whether a server-side virtual universe is available; and a construction component configured to provide a client-side simulated virtual universe environment in the case that the server-side virtual universe is unavailable.

25 Claims, 6 Drawing Sheets

(56) References Cited

U.S. PATENT DOCUMENTS

| | | | |
|---|---|---|---|
| 2004/0002843 A1* | 1/2004 | Robarts | A63F 13/10 703/13 |
| 2005/0170891 A1* | 8/2005 | Shim | A63F 13/12 463/42 |
| 2005/0246258 A1 | 11/2005 | Bantz et al. | |
| 2006/0004927 A1* | 1/2006 | Rehman | G06F 17/30861 709/250 |
| 2007/0094325 A1* | 4/2007 | Ih | A63F 13/12 709/203 |
| 2007/0238499 A1* | 10/2007 | Wright | A63F 13/10 463/1 |
| 2007/0265089 A1* | 11/2007 | Robarts | A63F 13/12 463/42 |
| 2008/0081701 A1 | 4/2008 | Shuster | |
| 2008/0102955 A1* | 5/2008 | D'Amora et al. | 463/42 |
| 2008/0133652 A1* | 6/2008 | Richards | A63F 13/12 709/203 |
| 2008/0214253 A1* | 9/2008 | Gillo et al. | 463/1 |
| 2008/0220873 A1* | 9/2008 | Lee et al. | 463/42 |
| 2009/0271707 A1* | 10/2009 | Lin | G06F 17/30893 715/738 |
| 2011/0053693 A1* | 3/2011 | Wright | 463/42 |

FOREIGN PATENT DOCUMENTS

| | | |
|---|---|---|
| JP | 2000-215177 A | 8/2000 |
| JP | 2002-315967 A | 10/2002 |

OTHER PUBLICATIONS

Elnozahy, E. N. et al., "A Survey of Rollback-Recovery Protocols in Message-Passing Systems," ACM Computing Surveys, col. 34, No. 3, Sep. 2002, pp. 375-408.

Rollestone, G. et al, "Networked information services in context sensitive environments," DIS2002, Lonson. Copyright 2002. ACM-1-58113-515-7/02/0006, 3 pages.

Harry, D. et al., "Information Spaces—Building Meeting Rooms in Virtual Environments," CHI 2008, Apr. 5-Apr. 10, 2008, Florence, Italy. ACM 978-1-60558-012-8/08/04, pp. 3741-3746.

Hiroshi Murakami, Information Materials for IDS, JPO Office Action Sep. 3, 2013, 2 pages.

Hiroshi Murakami, Information Materials for IDS, JPO Office Action Mar. 20, 2014, 2 pages.

* cited by examiner

CLIENT-SIDE SIMULATED VIRTUAL UNIVERSE ENVIRONMENT

FIELD OF THE INVENTION

This invention relates generally to virtual universes and more specifically to alternative virtual universe environments.

BACKGROUND OF THE INVENTION

Virtual universes or virtual worlds are computer-based simulated environments intended for its users or residents to inhabit and interact via avatars, which are personas or representations of the users of the virtual universes. These types of virtual universes are now most common in massively multiplayer online games such as Second Life®, which is a trademark of Linden Research Inc. in the United States. Avatars in these types of virtual universes, which can number well over a million, have a wide range of business and social experiences.

As virtual worlds become increasingly available, stable, and popular, they are now regularly being used as meeting places for individuals and businesses. This being the case, often an individual will schedule a time either alone or with others to perform some function within the virtual universe. The function may be a business meeting, a personal meeting, time to review and update avatar inventory, etc. Additionally, users enter a virtual universe to make purchases of real or virtual items. However, with prior art systems, users are unable to engage in these activities if the VU is temporarily unavailable.

SUMMARY OF THE INVENTION

In one embodiment, there is a method for providing a client-side simulated VU environment. In this embodiment, the method comprises: identifying whether a server-side virtual universe is available; and providing a client-side simulated virtual universe environment in the case that the server-side virtual universe is unavailable.

In a second embodiment, there is a computer system for providing a client-side simulated VU environment. In this embodiment, the system comprises at least one processing unit and memory operably associated with the at least one processing unit. A simulation tool is storable in memory and executable by the at least one processing unit. The simulation tool comprises an analysis component configured to identify whether a server-side virtual universe is available; and a construction component configured to provide a client-side simulated virtual universe environment in the case that the server-side virtual universe is unavailable.

In a third embodiment, there is a computer-readable medium storing computer instructions, which when executed, enables a computer system to provide a client-side simulated VU environment. In this embodiment, the computer instructions comprise: identifying whether a server-side virtual universe is available; and providing a client-side simulated virtual universe environment in the case that the server-side virtual universe is unavailable.

In a fourth embodiment, there is a method for deploying a simulation tool for use in a computer system that provides a client-side simulated VU environment. In this embodiment, a computer infrastructure is provided and is operable to: identify whether a server-side virtual universe is available; and provide a client-side simulated virtual universe environment in the case that the server-side virtual universe is unavailable.

In a fifth embodiment, there is a method for generating an alternative virtual universe on a client, the method comprising generating an alternative virtual universe operating on a client based on at least one of the following: a performance of a virtual universe operating on a server, or a request to operate the alternative virtual universe on the client.

Figure 1:
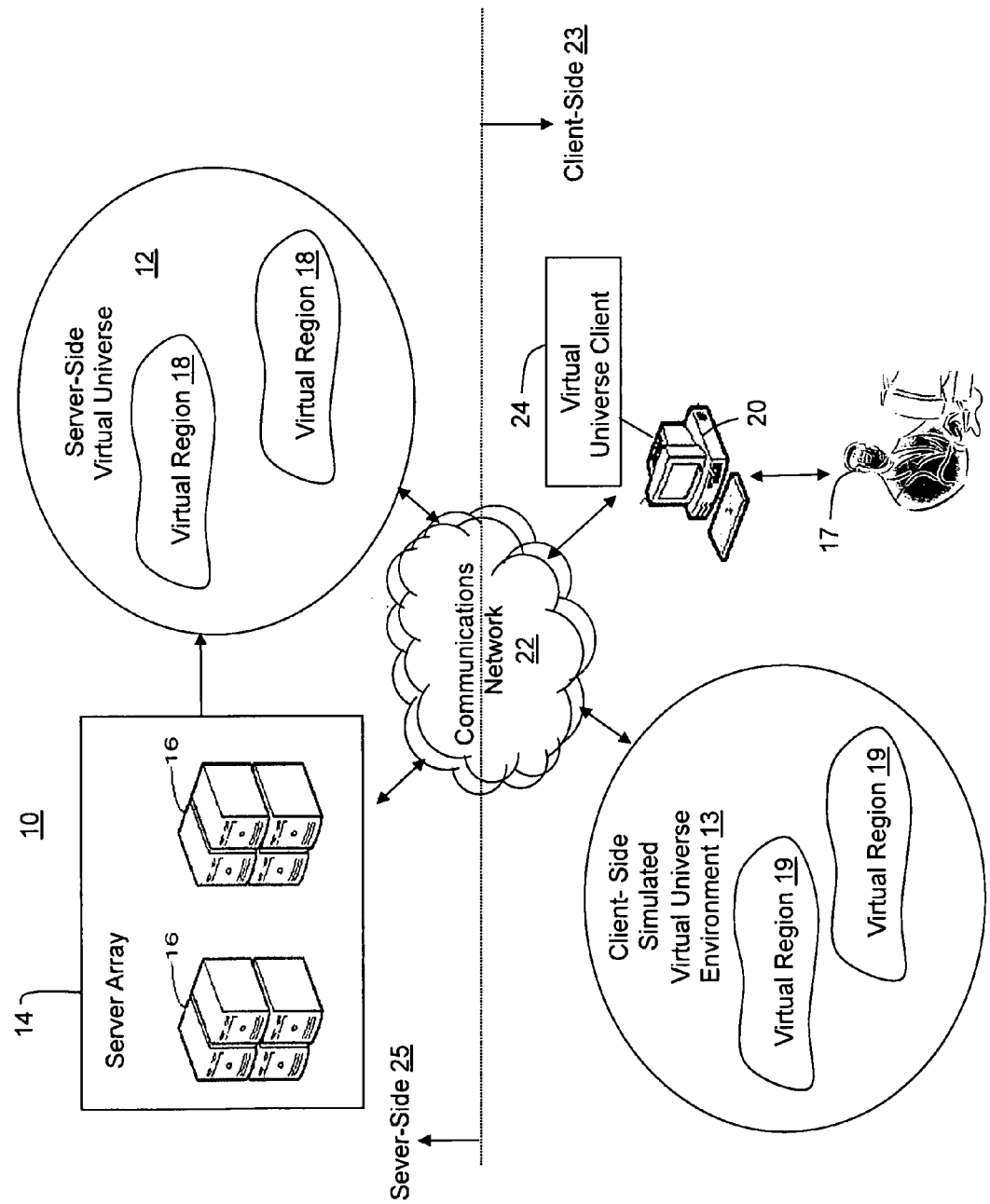
FIG. 1 shows a high-level schematic diagram showing a networking environment for providing a server-side virtual universe and a client-side simulated virtual universe environment according to embodiments of this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to providing a client-side simulated virtual universe (VU) environment when a desired server-side VU is unavailable. In these embodiments, a simulation tool provides this capability. Specifically, the simulation tool comprises an analysis component configured to identify whether a server-side VU is available; and a construction component configured to provide a client-side simulated VU environment in the case that the server-side VU is unavailable.

FIG. 1 shows a high-level schematic diagram showing a networking environment 10 for providing a server-side virtual universe 12 (hereinafter also referred to as "virtual universe 12") according to embodiments of this invention in which a service for providing a client-side simulated virtual universe environment can be utilized. As shown in FIG. 1, networking environment 10 comprises a server array or grid 14 comprising a plurality of servers 16, each responsible for managing a portion of virtual real estate within virtual universe 12. A virtual universe provided by a multiplayer online game, for example, can employ thousands of servers to manage all of the virtual real estate. The virtual content of the virtual real estate that is managed by each of servers 16 within server array 14 shows up in virtual universe 12 as a virtual region 18 made up of objects, textures and scripts. Each virtual region 18 within virtual universe 12 may comprise a landscape having virtual content, such as buildings, stores, clubs, sporting arenas, parks, beaches, cities and towns. These examples of virtual content are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe, or even only one region in a small virtual universe.

FIG. 1 also shows that a user 17 operating computer 20 interacts with virtual universe 12 through a communication network 22 via a virtual universe client 24 that resides in computer 20. User 17, via virtual universe client 24, may also communicate with a client-side simulated VU environment 13 on a server-side 25 of networking environment 10. As will be further described herein, client-side simulated VU environment 13 is generated in the case that virtual universe 12 is unavailable (i.e., not working, operating slowly, experiencing a technical failure, etc.). It will be appreciated that client-side simulated VU environment 13, similar to virtual region 18, is made up of objects, textures and scripts. Each virtual region 19 within client-side simulated VU environment 13 may comprise a landscape having virtual content, such as buildings, stores, clubs, sporting arenas, parks, beaches, cities and towns. It will be appreciated that client-side simulated VU environment 13 may not be as functional or as detailed as virtual universe 12, which has access to server array 14 containing the complete information needed to render client-side simulated VU environment 13, track the motion of avatars, and related. Client-side simulated VU environment 13 may operate in one or two-dimensions, including lower resolution graphics and/or with items that are intentionally missing from the full VU rendition. However, it may be possible for virtual universe client 24 to run more dimensions and/or higher resolution graphics in client-side simulated VU environment 13, for example, if virtual universe client 24 contains pre-cached information (e.g., avatar accessories, clothing, landscapes) on client-side 23. Further, rendering details may be reduced with each avatar joining client-side simulated VU environment 13, and may ultimately require one or more avatars joining in text mode only. In another embodiment, client-side simulated VU environment 13 would limit the number of joining avatars based on dynamic criteria, such as real-time client-side 23 performance measures. In a peer-to-peer embodiment, client-side simulated VU environment 13 may define and impose any number of individual constraints.

Figure 2:
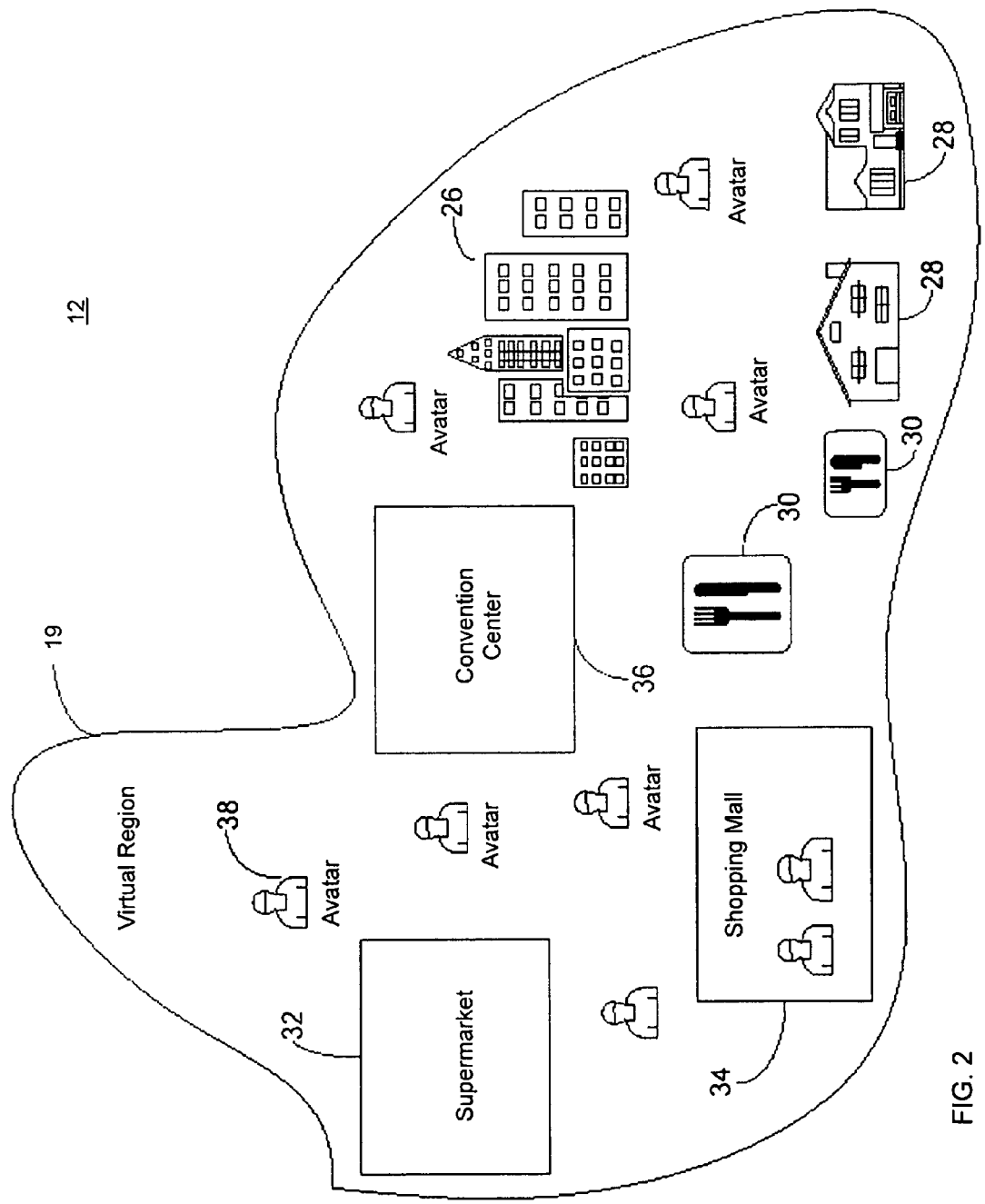
FIG. 2 shows a more detailed view of a virtual region shown in the virtual universe and the client-side simulated virtual universe of FIG. 1.

FIG. 2 shows a more detailed view of an exemplary virtual region found in client-side simulated VU environment 13. As an example, virtual region 19 shown in FIG. 2 comprises virtual content, including: a downtown office center 26, homes 28, restaurants 30, a supermarket 32 and a shopping mall 34 for shopping, and a convention center 36 for meetings and various conventions. An avatar 38, which as mentioned above, is a persona or representation of a user of the virtual universe, roams all about virtual region 19 by walking, driving, flying or even by teleportation or transportation, which is essentially moving through the virtual universe from one point to another, more or less instantaneously.

Figure 3:
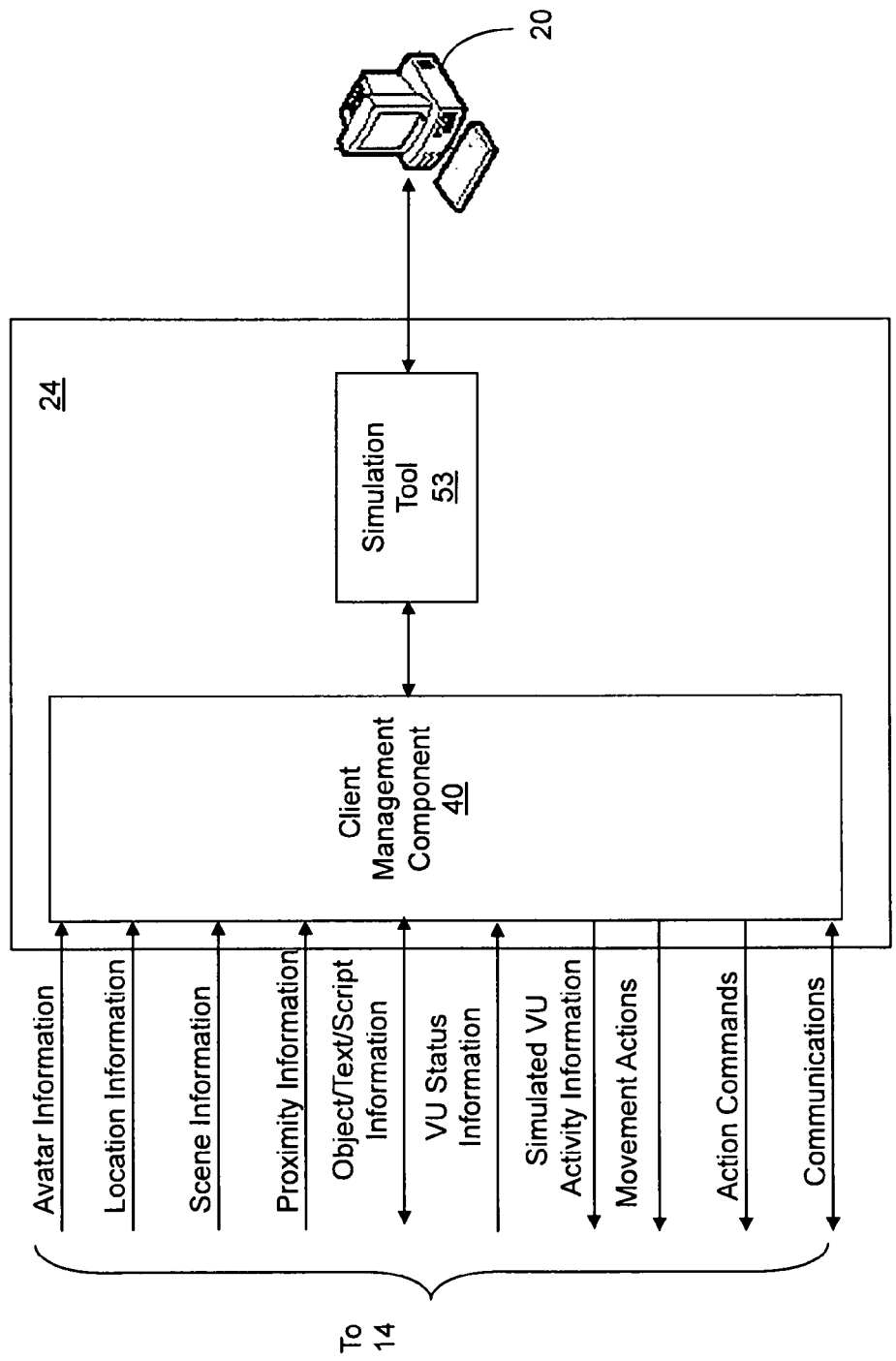
FIG. 3 shows a more detailed view of the virtual universe client shown in FIG. 1.

FIG. 3 shows a more detailed view of virtual universe client 24 shown in FIG. 1. Virtual universe client 24, which enables users to interact with virtual universe 12 and client-side simulated VU environment 13, comprises a client management component 40, which manages actions, movements and communications made by user 17 through computer 20, as well as information received from virtual universe 12 through server array 14. Client management component enables user 17 of computer 20 to visualize his or her avatar within the surroundings of the particular region of virtual universe 12 and/or client-side simulated VU environment 13 that the avatar is presently located.

As shown in FIG. 3, the present invention comprises a simulation tool 53, which provides client-side simulated VU environment 13. As will be further described below, construction of client-side simulated virtual universe environment 13 is beneficial as it permits at least one of the following to continue even if server-side virtual universe 12 is temporarily unavailable: interaction between users within the client-side simulated virtual universe environment, restricted avatar movement, or avatar appearances similar to avatar appearances in the server-side virtual universe. In the exemplary embodiment, simulation tool 53 resides on the same computer system as virtual universe client 24. In other embodiments, simulation tool 53 might reside on one or more devices external to both VU client 24 and server array 14.

FIG. 3 shows the various types of information received by client management component 40 from the virtual universe through server array 14. In particular, client management component 40 receives avatar and location information about the area that the user's avatar is near (e.g., what region or land he or she is in), as well as scene information (e.g., what the avatar sees). Client management component 40 also receives proximity information, which contains information on what the user's avatar is near, and information about the objects, texts, and scripts renderable in VU 12 and client-side simulated VU environment 13. Client management component 40 also receives VU status information, which is information about whether virtual universe 12 is available. FIG. 3 also shows the movement and action commands that are generated by the user and sent to the server array via client management component 40, the communications that can be sent to other avatars within virtual universe 12 and client-side simulated VU environment 13, as well as VU activity information, which is information regarding a set of activities (e.g., changes, purchases) performed within client-side simulated VU environment 13.

Figure 4:
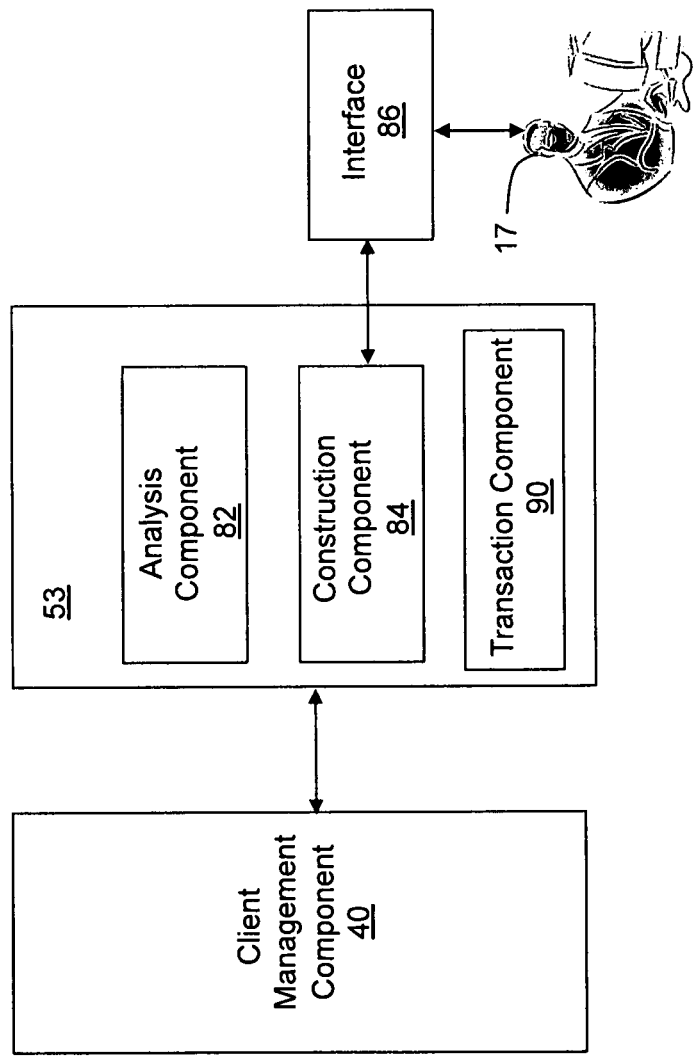
FIG. 4 shows a simulation tool according to embodiments of this invention that operates in the environment shown in FIG. 1.

Referring now to FIGS. 1 and 4, simulation tool 53 of the present invention will be described in further detail. As shown, simulation tool 53 comprises an analysis component 82 configured to identify whether server-side virtual universe 12 is available. As used herein, server-side virtual universe 12 may be considered unavailable, for example, if it is unreachable over a network (e.g. due to a poor network connection), the server is not working or is running slowly or improperly (e.g. due to too many users, due to a malicious attack on the server, or due to a malfunction of one or more servers in a server farm), the cost of providing virtual universe functionality via the server is high (e.g. during times of the day when electricity prices are high, when the cost of computer farm cooling power is high due to a hot day, or if there is a predicted impending electrical blackout or brownout), or because the user has not paid for a premium service (e.g. those users who have paid an amount above a threshold value P may find the server "unavailable" for a time period). Analysis component 82 monitors status information regarding virtual universe 12 and delivers it to a construction component 84, which is configured to provide client-side simulated VU environment 13 in the case that server-side VU 12 is unavailable. In a preferred embodiment, construction component 84 is configured to generate an interface (e.g., a graphical user interface) 86 to provide client-side simulated VU environment 13 to user 17 when virtual universe 12 is unavailable.

Construction component 84 is configured to generate a client-side communication session operable within client-side simulated VU environment 13 with the goal of allowing continuous communication on a limited basis. In one embodiment, construction component 84 is configured to generate a two-way textual communication interface for real-time communication between multiple users within the client-side simulated virtual universe in the case that the server-side virtual universe is unavailable. Simulation tool 53 may use a third party messaging system (i.e., chat system) to link users of the disconnected client-side simulated virtual universe 12 via third-party messaging systems. In this way, if server-side virtual universe 12 becomes unavailable, users are provided with a client-side chat interface that is available until client-side simulated VU 12 comes back on-line, or for a short period thereafter, etc.

In another embodiment, user 17, through his or her avatar, may wish to conduct a meeting with one or more other avatars. Construction component 84 is capable of replicating popular meeting locations found in virtual universe 12 within client-side simulated VU environment 13 to allow users to continue to communicate with one another. For example, if there is an interruption in the service of virtual universe 12 while one or more users are communicating, simulation component 53 begins a crash-recovery mode, which may include providing a similar meeting location within client-side simulated VU environment 13 to allow uninterrupted communication between users. In another embodiment, a private meeting location may be generated in client-side simulated VU environment 13 even if virtual universe 12 is completely operational at the time to allow an alternative setting in which to communicate. For example, simulation component 53 may receive a request to transfer operation of the virtual universe to client-side simulated environment 13, e.g., for advertising or trial/testing purposes. In this way, virtual universe 12 may be temporarily "pushed" to client-side 23 at the request of user 17, a third party, or an administrator of virtual universe 12.

In another embodiment, the client-side communication session may be a business transaction between user 17 and a business entity (e.g., supermarket 32 or shopping mall 34 in FIG. 2). For example, user 17 may typically go to shopping mall 34 to browse and purchase various items. Using an agreed-upon standard, shopping mall 34 may provide an interface to the client-side simulated VU environment 13 so that user 17 may still make purchases. In one example, shopping mall 34 may have a World Wide Web version that is automatically made easily accessible from client-side simulated VU environment 13 if virtual universe 12 is down or operating slowly.

In the present invention, client-side simulated VU environment 13 is generally offered as a temporary measure with the intention that user 17 will resume activity in virtual universe 12. Therefore, during the time that client-side simulated VU environment operates, analysis component 82 periodically checks whether virtual universe 12 is functioning properly. If it is, an option is provided to user 17 via interface 86 to resume the connection with virtual universe 12. In order to provide an efficient transition back to normal operation, analysis component 82 is configured to update server-side virtual universe 12 with information regarding a set of activities (e.g., communications, meetings, business transactions, etc.) performed within client-side simulated VU environment 13. Specifically, while client-side simulated VU environment 13 is operational, analysis component 82 monitors the set of activities performed within client-side simulated VU environment 13, stores the information regarding the set of activities performed within client-side simulated VU environment 13 on client-side 23, and updates VU 12 with all relevant information. For example, changes or modifications performed within client-side simulated VU environment 13 that may affect other users of VU 12 should be addressed.

Simulation tool 53 reconciles these modifications using a concurrent versioning approach, in which modifications are "checked-in" from client-side simulated VU environment 13 with conflicts being noted for resolution before virtual universe 12 is fully updated. In one embodiment, some activities are recorded and synchronized, while others are not. For example, there may be no need to save and synchronize the chat logs from every client-side session. However, if a transaction involving money or inventory is executed, it is generally desirable to capture the data and update virtual universe 12 on server-side 25.

In another embodiment of this invention, simulation tool 53 is used as a service to charge fees to users of client-side simulated VU environment 13. As shown in FIG. 4, simulation tool 53 comprises a transaction component 90 configured to charge a simulation fee for providing client-side simulated VU environment 13 in the event virtual universe 12 becomes unavailable. In this embodiment, the provider of virtual universe 12 or a third party service provider could offer this as a service by performing the functionalities described herein on a subscription and/or fee basis. In this case, the provider of the virtual universe or the third party service provider can create, deploy, maintain, support, etc., simulation tool 53 that performs the processes described in the invention. In return, the virtual universe or the third party service provider can receive payment from the virtual universe users.

As described herein, the present invention provides a method for generating an alternative virtual universe operating on a client based on at least one of the following: a performance of a virtual universe operating on a server, or a request to operate the alternative virtual universe on the client. As such, the present invention improves the user experience because it allows users access to a simulated VU interface even when a desired VU environment is not available or functioning too slowly to be useful and/or enjoyable.

In still another embodiment, the methodologies disclosed herein can be used within a computer system to provide a client-side simulated VU environment. In this case, simulation tool 53 can be provided, and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 5:
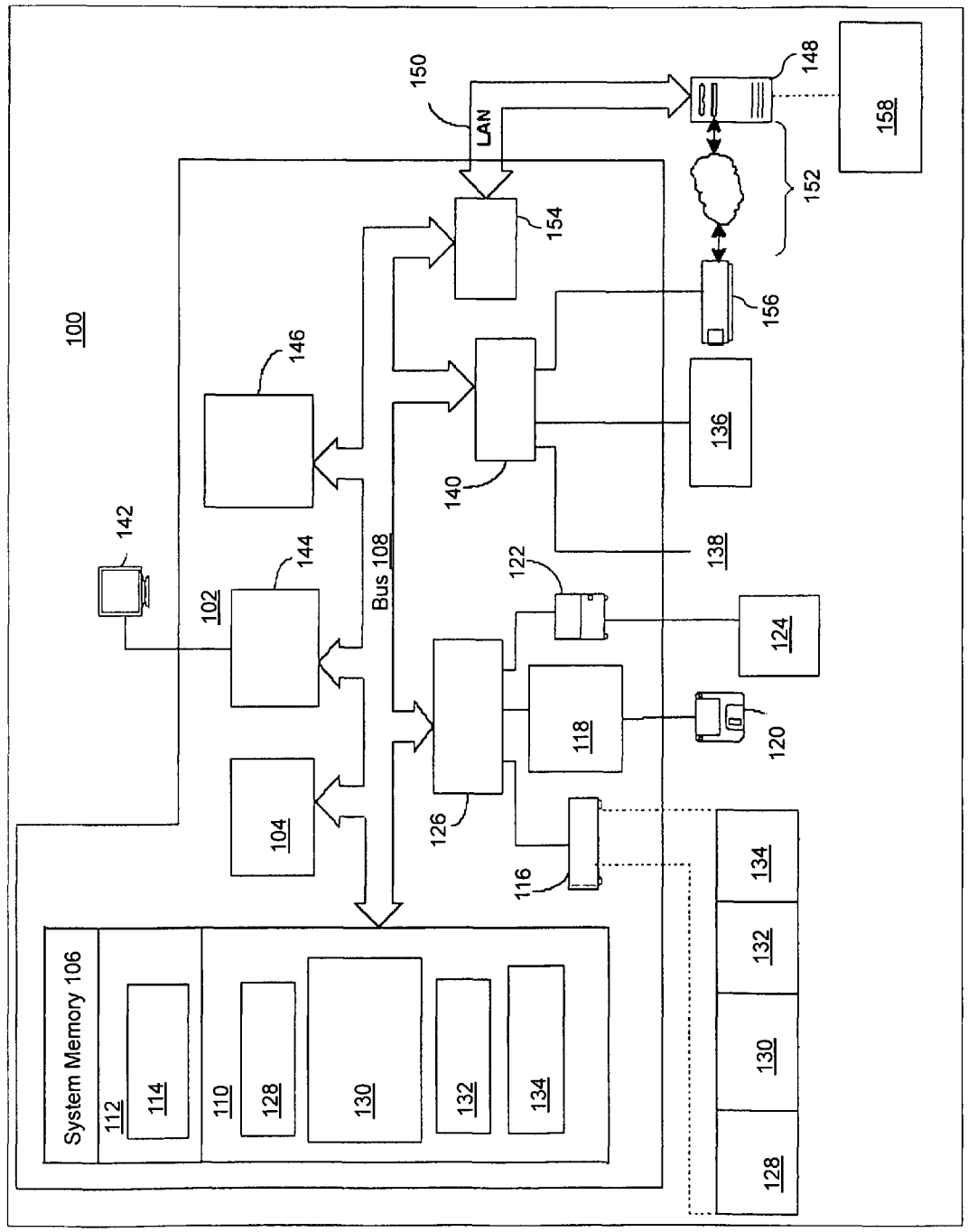
FIG. 5 shows a schematic of an exemplary computing environment in which elements of the networking environment shown in FIG. 1 may operate.

FIG. 5 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should computing environment 100 be interpreted as having any dependency or requirement relating to any one or combination of components illustrated in FIG. 5.

In the computing environment 100 there is a computer 102, which is operational with numerous other general purpose or special purpose computing system environments or configurations. Examples of well known computing systems, environments, and/or configurations that may be suitable for use with exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on that perform particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 5, computer 102 in the computing environment 100 is shown in the form of a general-purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 5, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Figure 6:
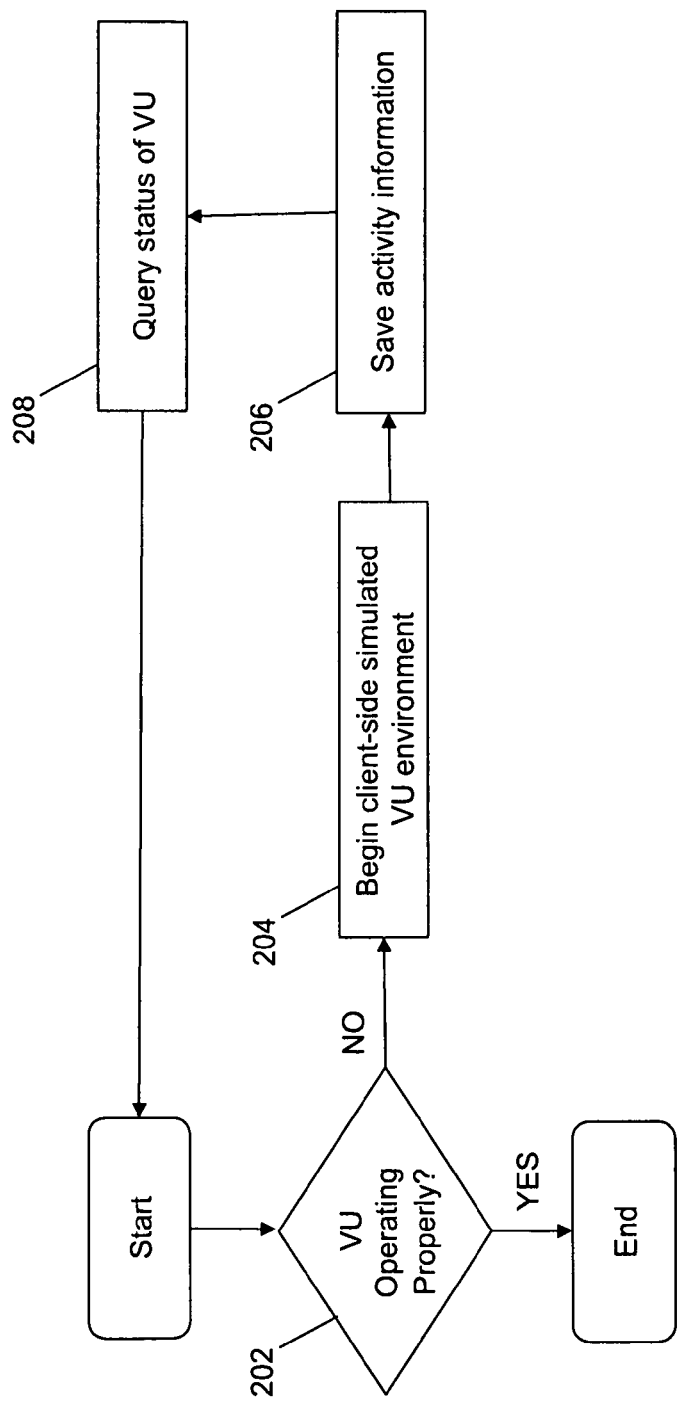
FIG. 6 shows a flow diagram of a method for providing a client-side simulated VU environment according to embodiments of the invention.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example, and not limitation, an operating system 128, one or more application programs 130, other program modules 132, and program data 134. Each of operating system 128, one or more application programs 130 other program modules 132, and program data 134 or some combination thereof, may include an implementation of the networking environment 10 of FIG. 1 including server array 14, virtual universe client 24 and simulation tool 53. In one embodiment, the one or more application programs 130 include components of simulation tool 53 such as analysis component 82, construction component 84, and transaction component 90.

The one or more program modules 130 carry out the methodologies disclosed herein, as shown in FIG. 6. According to one embodiment, the process starts and at 202 where it is identified whether the virtual universe is available. If no, then a client-side simulated VU environment is constructed at 204. Next, at 206, all activity that is performed within client-side simulated VU environment is saved, and the virtual universe is queried to determine whether it is available yet at 208. The flowchart of FIG. 6 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Referring back to FIG. 5, a user may enter commands and information into computer 102 through optional input devices such as a keyboard 136 and a pointing device 138 (e.g., a "mouse"). Other input devices (not shown) may include a microphone, joystick, game pad, satellite dish, serial port, scanner, camera, or the like. These and other input devices are connected to processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 5 are a local area network (LAN) 150 and a general wide area network (WAN) 152. Such networking environments are commonplace in offices, enterprise-wide computer networks, intranets, and the Internet. When used in a LAN networking environment, computer 102 is connected to LAN 150 via network interface or adapter 154. When used in a WAN networking environment, the computer typically includes a modem 156 or other means for establishing communications over WAN 152. The modem, which may be internal or external, may be connected to system bus 108 via user input interface 140 or other appropriate mechanism.

In a networked environment, program modules depicted relative to computer 102, or portions thereof, may be stored in a remote memory storage device. By way of example, and not limitation, FIG. 5 illustrates remote application programs 158 as residing on a memory device of remote computer 148. It will be appreciated that the network connections shown and described are exemplary and other means of establishing a communications link between the computers may be used.

An implementation of computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for providing a client-side simulated VU environment. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A computer implemented method for providing a client-side simulated virtual universe environment, comprising:

identifying whether a server-side virtual universe is available;

accessing, in response to an indication that the server-side virtual universe is available, the server-side virtual universe generated entirely by a remote server and having a graphical avatar-based virtual meeting room, wherein each of the avatars in the graphical avatar-based virtual meeting room is a graphical representation of a user of the virtual universe through which the user interacts with the virtual universe;

providing, in response to an indication that the server-side virtual universe is not available, a client-side simulated virtual universe environment that is a simulation of at least a portion of the server-side virtual universe generated by a client-side device and includes the graphical avatar-based virtual meeting room capable of continuing an on-going interaction between a client-side device and another entity present in the server-side simulated virtual universe on a peer to peer basis during a time in which the server side virtual universe is not available, including a live communication session, in the client-side simulated virtual universe, between a user of the client-side device and another user present in the server-side virtual universe, wherein the client-side virtual universe environment is rendered with lower resolution graphics than the server-side virtual universe;

recording information regarding a set of activities performed within the client-side simulated virtual universe environment during the time in which the server side virtual universe is not available, wherein the set of activities includes a business transaction between the user and the another user; and updating, in response to a subsequent indication that the server-side virtual universe is again available, the server-side virtual universe with the information regarding the set of activities, wherein any changes to money and any changes to inventory of the user and the another user as a result of the business transaction are updated on the server-side virtual universe.

2. The method according to claim 1 further comprising generating a client-side communication session operable within the client-side simulated virtual universe environment.

3. The computer implemented method according to claim 1 further comprising:

monitoring a set of activities performed within the client-side simulated virtual universe environment; and storing information regarding the set of activities performed within the client-side simulated virtual universe environment on the client-side.

4. The computer implemented method according to claim 3 further comprising updating the server-side virtual universe with the information regarding the set of activities performed within the client-side simulated virtual universe environment.

5. The computer implemented method according to claim 2, the client-side communication session comprising a two-way textual communication interface for real-time communication between multiple users within the client-side simulated virtual universe in the case that the server-side virtual universe is unavailable.

6. The computer implemented method according to claim 1, the client-side simulated virtual universe environment permitting at least one of the following: interaction between users within the client-side simulated virtual universe environment, restricted avatar movement, or avatar appearances similar to avatar appearances in the server-side virtual universe.

7. A computer system for providing a client-side simulated virtual universe environment, comprising:
    at least one processing unit;
    memory operably associated with the at least one processing unit; and
    a simulation tool storable in memory and executable by the at least one processing unit, the simulation tool comprising:
    an analysis component configured to identify whether a server-side virtual universe is available;
    a communication component configured to access, in response to an indication that the server-side virtual universe is available, the server-side virtual universe generated entirely by a remote server and having a graphical avatar-based virtual meeting room, wherein each of the avatars in the graphical avatar-based virtual meeting room is a graphical representation of a user of the virtual universe through which the user interacts with the virtual universe;
    a construction component configured to provide, in response to an indication that the server-side virtual universe is not available, a client-side simulated virtual universe environment that is a simulation of at least a portion of the server-side virtual universe generated by a client-side device and includes the graphical avatar-based virtual meeting room capable of continuing an on-going interaction between a client-side device and another entity present in the server-side simulated virtual universe on a peer to peer basis during a time in which the server side virtual universe is not available, including a live communication session, in the client-side simulated virtual universe, between a user of the client-side device and another user present in the server-side virtual universe, wherein the client-side virtual universe environment is rendered with lower resolution graphics than the server-side virtual universe; and
    an analysis component configured to record information regarding a set of activities performed within the client-side simulated virtual universe environment during the time in which the server side virtual universe is not available, wherein the set of activities includes a business transaction between the user and the another user, and to update, in response to a subsequent indication that the server-side virtual universe is again available, the server-side virtual universe with the information regarding the set of activities, wherein any changes to money and any changes to inventory of the user and the another user as a result of the business transaction are updated on the server-side virtual universe.

8. The computer system according to claim 7, the construction component further configured to generate a client-side communication session operable within the client-side simulated virtual universe environment.

9. The computer system according to claim 7, the analysis component further configured to:
    monitor a set of activities performed within the client-side simulated virtual universe environment; and
    store information regarding the set of activities performed within the client-side simulated virtual universe environment on the client-side.

10. The computer system according to claim 9, the analysis component further configured to update the server-side virtual universe with the information regarding the set of activities performed within the client-side simulated virtual universe environment.

11. The computer system according to claim 8, the construction component further configured to generate a two-way textual communication interface for real-time communication between multiple users within the client-side simulated virtual universe in the case that the server-side virtual universe is unavailable.

12. The computer system according to claim 7, wherein the client-side simulated virtual universe environment permits at least one of the following: interaction between users within the client-side simulated virtual universe environment, restricted avatar movement, or avatar appearances similar to avatar appearances in the server-side virtual universe.

13. A non-transitory computer-readable storage medium storing computer instructions, which when executed, enables a computer system to provide a client-side simulated virtual universe environment, the computer instructions comprising:
    identifying whether a server-side virtual universe is available;
    accessing, in response to an indication that the server-side virtual universe is available, the server-side virtual universe generated entirely by a remote server and having a graphical avatar-based virtual meeting room, wherein each of the avatars in the avatar-based virtual meeting room is a graphical representation of a user of the virtual universe through which the user interacts with the virtual universe;
    providing, in response to an indication that the server-side virtual universe is not available, a client-side simulated virtual universe environment that is a simulation of at least a portion of the server-side virtual universe generated by a client-side device and includes the graphical avatar-based virtual meeting room capable of continuing an on-going interaction between a client-side device and another entity present in the server-side simulated virtual universe on a peer to peer basis during a time in which the server side virtual universe is not available, including a live communication session, in the client-side simulated virtual universe, between a user of the client-side device and another user present in the server-side virtual universe, wherein the client-side virtual universe environment is rendered with lower resolution graphics than the server-side virtual universe;
    recording information regarding a set of activities performed within the client-side simulated virtual universe environment during the time in which the server side virtual universe is not available, wherein the set of activities includes a business transaction between the user and the another user; and
    updating, in response to a subsequent indication that the server-side virtual universe is again available, the server-side virtual universe with the information regarding the set of activities, wherein any changes to money and any changes to inventory of the user and the another user as a result of the business transaction are updated on the server-side virtual universe.

14. The non-transitory computer-readable storage medium according to claim 13 further comprising computer instructions for generating a client-side communication session operable within the client-side simulated virtual universe environment.

15. The non-transitory computer-readable storage medium according to claim 13 further comprising computer instructions for:
monitoring a set of activities performed within the client-side simulated virtual universe environment; and
storing information regarding the set of activities performed within the client-side simulated virtual universe environment on the client-side.

16. The non-transitory computer-readable storage medium according to claim 15 further comprising computer instructions for updating the server-side virtual universe with the information regarding the set of activities performed within the client-side simulated virtual universe environment.

17. The non-transitory computer-readable storage medium according to claim 14 further comprising computer instructions for generating a two-way textual communication interface for real-time communication between multiple users within the client-side simulated virtual universe in the case that the server-side virtual universe is unavailable.

18. The non-transitory computer-readable storage medium according to claim 13, wherein the client-side simulated virtual universe environment permits at least one of the following: interaction between users within the client-side simulated virtual universe environment, restricted avatar movement, or avatar appearances similar to avatar appearances in the server-side virtual universe.

19. A method for deploying a simulation tool for use in a computer system that provides a client-side simulated virtual universe environment, the method comprising:
providing a computer infrastructure operable to:
identify whether a server-side virtual universe is available;
access, in response to an indication that the server-side virtual universe is available, the server-side virtual universe generated entirely by a remote server and having a graphical avatar-based virtual meeting room, wherein each of the avatars in the avatar-based virtual meeting room is a graphical representation of a user of the virtual universe through which the user interacts with the virtual universe;
provide, in response to an indication that the server-side virtual universe is not available, a client-side simulated virtual universe environment that is a simulation of at least a portion of the server-side virtual universe generated by a client-side device and includes the graphical avatar-based virtual meeting room capable of continuing an on-going interaction between a client-side device and another entity present in the server-side simulated virtual universe on a peer to peer basis during a time in which the server side virtual universe is not available, including a live communication session, in the client-side simulated virtual universe, between a user of the client-side device and another user present in the server-side virtual universe, wherein the client-side virtual universe environment is rendered with lower resolution graphics than the server-side virtual universe;
record information regarding a set of activities performed within the client-side simulated virtual universe environment during the time in which the server side virtual universe is not available, wherein the set of activities includes a business transaction between the user and the another user; and
update, in response to a subsequent indication that the server-side virtual universe is again available, the server-side virtual universe with the information regarding the set of activities, wherein any changes to money and any changes to inventory of the user and the another user as a result of the business transaction are updated on the server-side virtual universe.

20. The method according to claim 19, the computer infrastructure further operable to generate a client-side communication session operable within the client-side simulated virtual universe environment.

21. The method according to claim 19, the computer infrastructure further operable to:
monitor a set of activities performed within the client-side simulated virtual universe environment; and
store information regarding the set of activities performed within the client-side simulated virtual universe environment on the client-side.

22. The method according to claim 21, the computer infrastructure further operable to update the server-side virtual universe with the information regarding the set of activities performed within the client-side simulated virtual universe environment.

23. The method according to claim 20, the computer infrastructure further operable to generate a two-way textual communication interface for real-time communication between multiple users within the client-side simulated virtual universe in the case that the server-side virtual universe is unavailable.

24. The method according to claim 19, wherein the client-side simulated virtual universe environment permits at least one of the following: interaction between users within the client-side simulated virtual universe environment, restricted avatar movement, or avatar appearances similar to avatar appearances in the server-side virtual universe.

25. A method for generating a virtual universe operating on a client, the method comprising:
monitoring an on-going transaction in a server-side virtual universe between a user and a merchant operating within a graphical avatar-based virtual meeting room of the server-side virtual universe;
identifying whether the server-side virtual universe is available;
accessing, in response to an indication that the server-side virtual universe is available, the server-side virtual universe generated entirely by a remote server and having the graphical avatar-based virtual meeting room, wherein each of the avatars in the graphical avatar-based virtual meeting room is a graphical representation of a user of the virtual universe through which the user interacts with the virtual universe;
providing, in the case that the server-side virtual universe is unavailable, a client-side simulated virtual universe environment that is a simulation of at least a portion of the server-side virtual universe generated by a client-side device and includes the graphical avatar-based virtual meeting room capable of continuing an on-going interaction between a client-side device and another entity present in the server-side simulated virtual universe on a peer to peer basis during a time in which the server side virtual universe is not available, including a live communication session, in the client-side simulated virtual universe, between a user of the client-side device and another user present in the server-side virtual universe, wherein generation of the client-side virtual universe environment is initiated only in the case that the server-side virtual universe is unavailable, and wherein the client-side virtual universe environment is rendered with lower resolution graphics than the server-side virtual universe;

recording information regarding a set of activities performed within the client-side simulated virtual universe environment during the time in which the server side virtual universe is not available, wherein the set of activities includes a business transaction between the user and the another user; and updating, in response to a subsequent indication that the server-side virtual universe is again available, the server-side virtual universe with the information regarding the set of activities, wherein any changes to money and any changes to inventory of the user and the another user as a result of the business transaction are updated on the server-side virtual universe.

* * * * *